US006450365B1

(12) United States Patent
Yamazaki

(10) Patent No.: US 6,450,365 B1
(45) Date of Patent: Sep. 17, 2002

(54) GEM CLIP HOLDER

(75) Inventor: Nobuyuki Yamazaki, Tokyo (JP)

(73) Assignee: Hiromori Inc., Tokyo (JP)

( * ) Notice: Subject to any disclaimer, the term of this patent is extended or adjusted under 35 U.S.C. 154(b) by 0 days.

(21) Appl. No.: 09/611,746

(22) Filed: Jul. 7, 2000

(51) Int. Cl.[7] .................................................. B23Q 7/04
(52) U.S. Cl. .................................... 221/212; 221/312 R
(58) Field of Search ............................ 221/212, 312 R, 221/312 C; 206/340, 350, 818; 198/619

(56) References Cited

U.S. PATENT DOCUMENTS

| | | | | |
|---|---|---|---|---|
| 2,544,114 A | * | 3/1951 | Steinberg | |
| 3,269,528 A | * | 8/1966 | Leedy | |
| 3,587,835 A | * | 6/1971 | Shore | |

FOREIGN PATENT DOCUMENTS

| | | | | |
|---|---|---|---|---|
| GB | 2 241 692 A | * | 9/1991 | 221/212 |
| GB | 2 241 693 A | * | 9/1991 | 221/212 |
| JP | 2/85184 | | 3/1990 | |

* cited by examiner

*Primary Examiner*—David H. Bollinger
(74) *Attorney, Agent, or Firm*—Dilworth & Barrese LLP

(57) ABSTRACT

The present invention is directed to a magnetic holder for paper clips or other magnetizable items having a plurality of adjacent magnets arranged along a longitudinal direction such that magnetic fields either in the respective magnets and/or emanating therefrom are oriented in mutually opposite directions. Thus, magnetic lines of force within the respective fields point in mutually opposite direction with the magnetizable items (which are magnetically neutral) being thereby attracted by greater force than when magnets are arranged with magnetic force lines all pointing in the same direction. At the same time, the magnets can be additionally arranged such that one of the magnets adjacent a longitudinal end possesses greater magnetic strength than the other of the magnets, so that the magnetic lines of force are stronger at this longitudinal end and thereby attract the magnetizable items such as gem clips towards the longitudinal end.

17 Claims, 3 Drawing Sheets

GEM CLIP HOLDER

BACKGROUND OF THE INVENTION

The present invention is directed to a holder for small metallic items that are magnetizable such as paper clips, commonly known as gem clips. More particularly, the present invention is directed to such a gem clip holder or case which facilitates both retention and withdrawal of paper clips therefrom.

Paper clip cases and holders have been available for quite some time to retain small metallic objects that are magnetizable, notably paper clips, e.g., upon an office desk. There is a need to securely retain the gem clips in a case or holder so that the clips do not scatter; at the same time, there is a need to expedite withdrawal of such clips from the case in a smooth, quick manner. Attaining these needs has often been mutually exclusive.

For example, a prior art gem clip holder can be found in Japanese Patent Laid-Open HEI-2, (1990)-85184 which is directed to an easy-to-use handy case for storing small metallic utensils such as gem clips 12. According to this prior art embodiment, the container 2 holding the gem clips 12 moves along a cylinder 1, to come in contact with magnets 5*a*, 5*b*, 5*c*, positioned at the top of the cylinder 1. All the magnets 5*a*, 5*b*, 5*c* are installed along the cylinder 1 in overlapping fashion with magnetic force lines pointing in the same direction. The device disclosed in HEI.-2 (1990)-85184 can be unstable in that a large container 2 must move up and down a fairly narrow spindle or cylinder 1. Accordingly, there has been a need to design improved clip cases which do not suffer from the disadvantages of those in the prior art.

SUMMARY OF THE INVENTION

Accordingly, it is an object of the present invention to provide a new and improved case or holder for small metallic utensils such as paper or gem clips.

It is a more detailed object of the present invention to provide such a gem clip case or holder which facilitates withdrawal of the clips therefrom.

It is another object of the present invention to provide a case or holder for gem clips which will securely retain individual clips therein and, at the same time, facilitate withdrawal of the clips therefrom.

These and other objects are attained by the present invention which is directed to a magnetic holder for paper clips or other magnetizable items, comprising a plurality of adjacent magnets arranged along a longitudinal direction such that magnetic fields either within the respective magnets and/or emanating therefrom are oriented in mutually opposite directions, with magnetic lines of force within the respective magnetic fields pointing in mutually opposite directions. The magnetizable items (which are magnetically neutral) are thereby attracted by greater force than when magnets are arranged with magnetic force lines all pointing in the same direction. The magnets are additionally arranged such that one of the magnets adjacent a longitudinal end possesses greater strength than the other of the magnets, so that the magnetic lines of force are stronger at the longitudinal end thereby attracting the magnetizable items towards the longitudinal end. Thus, not only are the gem clips attracted with greater force in the clip case or holder of the present invention, but the magnetic force lines of the magnets also have a greater strength towards the top of the case or holder and weaker strength towards the bottom. As a result, it is possible to improve ease in withdrawing gem clips from the case or holder than in conventional clip cases or holders utilizing two or more magnets of identical strength. In other words, when magnets at the top and bottom of a clip holder possess the same magnetic strength, e.g., as in HEI.-2 (1990)-85184, the various magnets will mutually attract the gem clips with the same amount of strength and thus function unsatisfactorily. Moreover, when the bottom magnet possesses great strength, it will powerfully attract the gem clips and fail to release them. In contrast, in the present invention, when the bottom magnet has a relatively weaker strength and the top magnet a relatively greater strength then the powerful top magnet will attract the gem clips upwardly, improving ease in ability to remove clips from the holder or case.

BRIEF DESCRIPTION OF THE DRAWINGS

The present invention will be described in greater detail with reference to the accompanying drawings in which.

Additionally.

DESCRIPTION OF THE PREFERRED EMBODIMENTS

Figure 1:
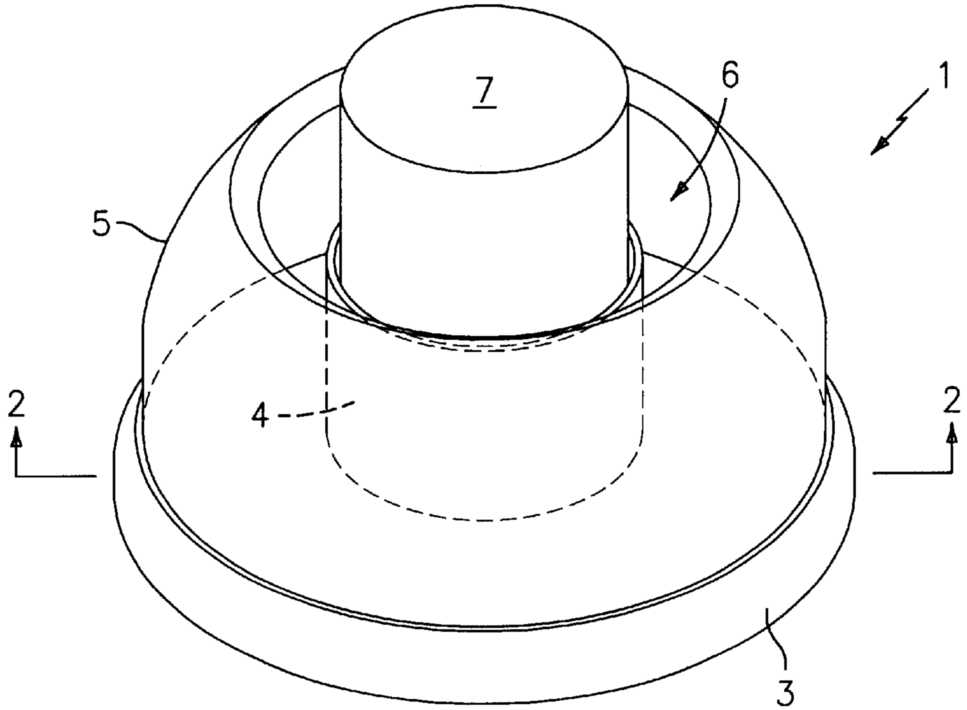
FIG. 1 is a perspective view of the clip case or holder in accordance with the present invention.
Figure 2:
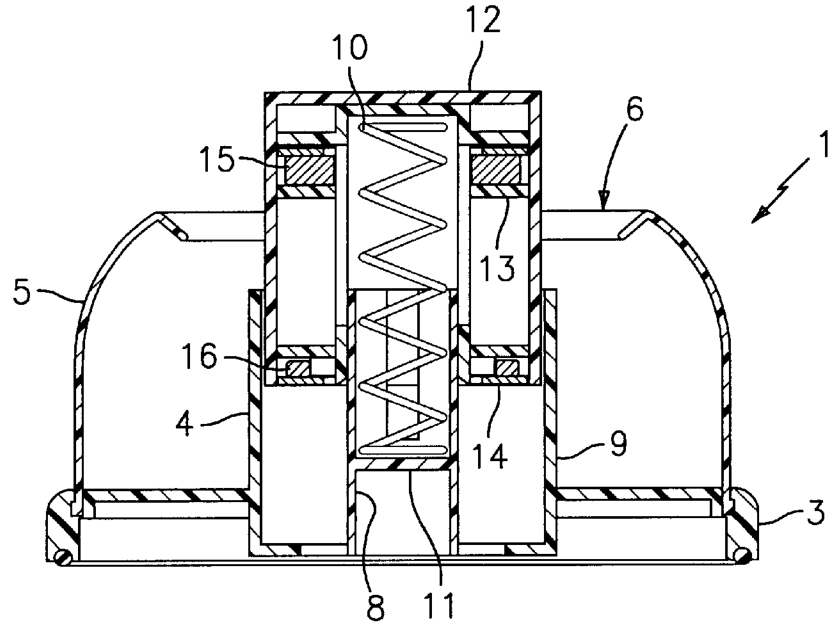
FIG. 2 is a sectional view along line 2—2 in FIG. 1.

Referring to the drawings, a case or holder 1 for gem clips 2 is shown which facilitates withdrawal of the clips 2 therefrom. The holder 1 comprises a circular base 3 upon which a spindle 4 is affixed and a transparent, dome shaped cover 5 mounted about the outer periphery. The dome-shaped cover 5 comprises a circular opening 6 through the crown thereof.

A cylinder 7 is movably mounted upon the spindle 4. As best seen in the enlarged view of FIG. 4, the cylinder 7 is annularly-shaped and disposed between inner 8 and outer 9 concentric portions of the spindle 4 to be movable therebetween. A coil spring 10 is mounted with one end thereof seated upon a platform 11 across the innermost diameter of the stationary spindle 4, and an opposite end abutting against closed end 12 of the cylinder 7, to bias the cylinder 7 upwardly and away from the base 3. Within the moveable concentric cylinder 7, there are two shelves 13 and 14 positioned to receive and support two respective permanent magnets 15 and 16. Additional shelves and accompanying magnets can be positioned in the cylinder within the context of the present invention. The magnets 15 and 16 themselves are completely circular, e.g., "donut"-shaped; alternatively, the magnets 15 and 16 can each have a gap in continuity, i.e., be incompletely circular, within the purview of the present invention. Magnets of different shapes, e.g., bar magnets, horseshoe magnets, etc. can also be utilized within the context of the present invention. The polarity of such magnets and attendant lines of force that are generated can best be understood with reference to the principles of a common horseshoe magnet.

As described in Fowler, Richard J., "Electricity Principles and Applications," Third Edition, Glencoe/McGraw-Hill, New York, 1989, pp. 136–138 (the contents of which are incorporated by reference herein), a conventional horseshoe magnet has two poles, with lines of magnetic force leaving one pole and entering the opposite pole. When a horseshoe magnet is hypothetically bent to form a complete annular circle (i.e., the donut-shape), then the magnetic field is confined within the magnet since the magnet has no poles. However, the magnetic field now circulates within the magnet either in clockwise or counterclockwise fashion and with the flat surfaces of the magnet having different directions of flux circulation. In other words, along one flat surface when viewed from above, the magnet field will be circulating, e.g., clockwise while along the opposite flat surface in the same magnet when viewed from below, the magnetic field will be circulating counterclockwise. These directions of magnetic circulation have been denoted upon magnets 15 and 16 by plus (+) and minus (−) signs adjacent the respective surfaces in the enlarged view of FIG. 4. The magnetic lines of force circulate in magnet 15 in one direction, i.e., clockwise or counterclockwise and in magnet 16 in the opposite direction.

Figure 4:
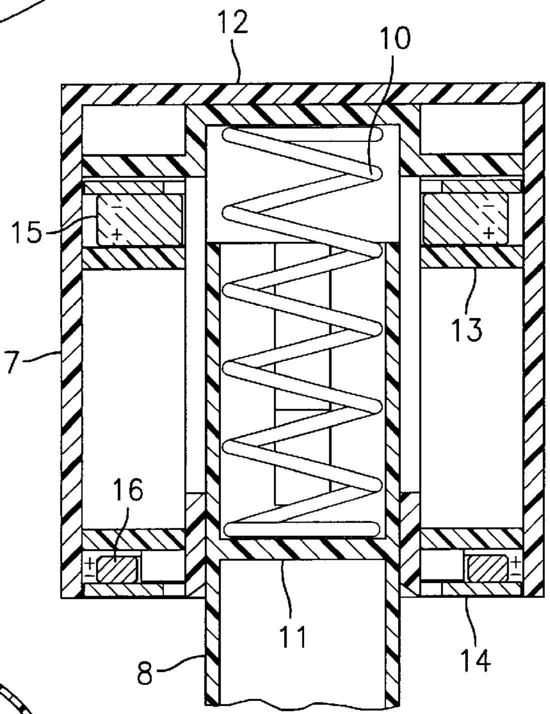
FIG. 4 is an enlarged view of a portion of the clip holder illustrated in the sectional view of FIG. 2.

Thus, the magnets 15 and 16 are explicitly oriented in the clip holder 1 of the present invention such that the magnetic fields within the respective magnets flow in mutually opposite directions as denoted by the plus (+) and minus (−) indicia in these magnets in FIG. 4. Such orientation of magnets is contrary to the prevailing state of the art as exemplified by HEI-2 (1990)-85184 where the magnets 5*a*, 5*b*, 5*c*, etc. are all oriented so that their magnetic lines of force all point in the same direction. It has been found that the individual clips 2 are attracted by the noted arrangement of magnets 15 and 16 with greater force than by the arrangement of magnets 5*a*, 5*b*, 5*c*, etc. in Hei-2 (1990)-85184. It is pointed out that the present invention can function just as well with appropriate arrangement of different shaped magnets, e.g., bar magnets with respective overlapping north and south poles so that the magnetic force lines of adjacent magnets point in mutually opposite directions.

Furthermore, as seen most clearly in the enlarged view of FIG. 4, the upper magnet 15 positioned furthest from the base 3 is considerably larger than the magnet 16 positioned closest to the base 3. This means the magnetic force lines possess greater strength towards the top of the holder 1, adjacent the top end 12 of the moveable cylinder 7 containing the magnets 15 and 16, and concomitantly weaker strength nearest the base 3. This improves ease of withdrawing clips 2 from the case because the relatively powerful top magnet 15 attracts the clips upwardly, making it easier to remove clips 2 nearest the top 12 of the cylinder and/or extending upwardly through the opening 6 in the crown of the cover 5. This is a distinct improvement over previous holders where the various magnets all have the same strength and thus attract clips equally. Additional magnets incorporated into the clip holder 1 should have varying size or strength between magnets 15 and 16 such that magnetic strength and force of attraction gradually and smoothly increase towards the top of the holder.

Figure 5:
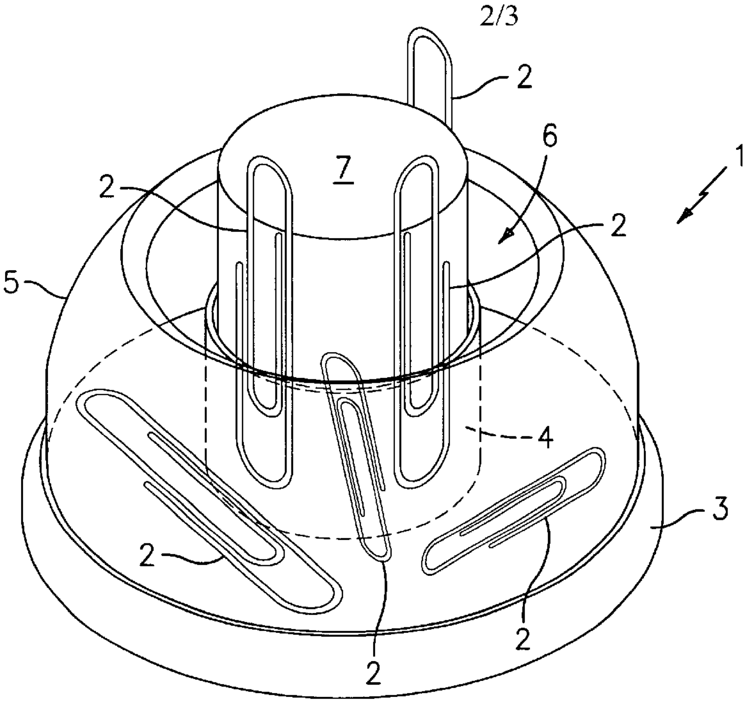
FIG. 5 is a schematic perspective view similar to FIG. 1 and illustrating the inventive clip case or holder with clips retained therein and thereon.
Figure 3:
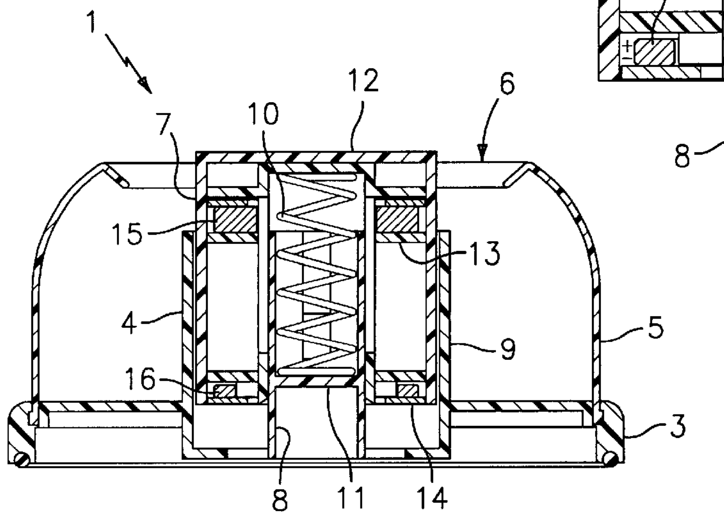
FIG. 3 is a sectional view similar to FIG. 2 and illustrating the inventive case or holder in depressed state.
Figure 6:
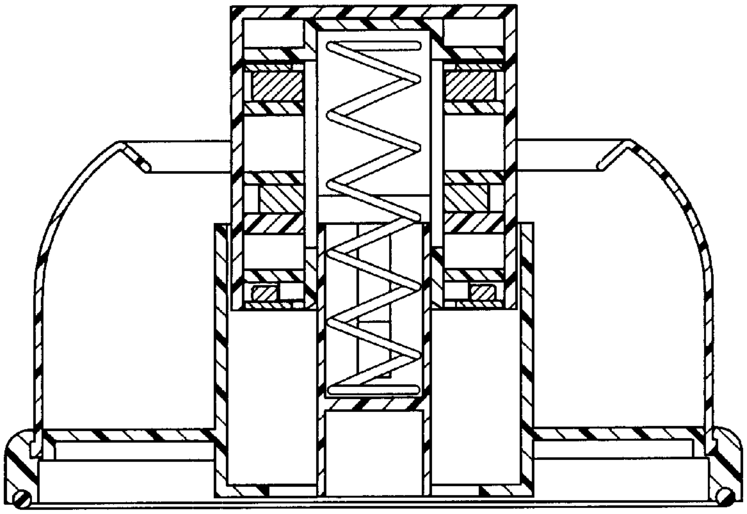
FIG. 6 is a sectional view similar to FIG. 2 and illustrating positioning of three magnets in the clip case or holder in accordance with the present invention.
Figure 7:
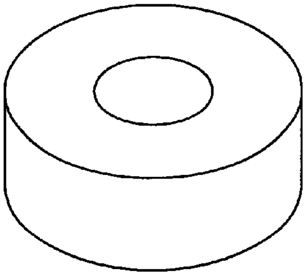
FIG. 7 is a perspective view of a magnet in the form of a complete annular circle in accordance with the present invention.
Figure 8:
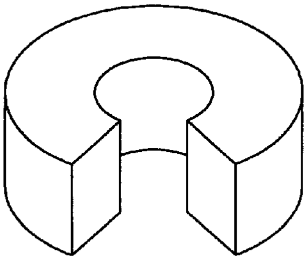
FIG. 8 is a perspective view, similar to FIG. 7, and illustrating the annular magnet having a gap in continuity.

In FIG. 5, a few clips 2 are illustrated in the container 5 of the holder 1 as being attracted to the magnets 15 and 16 within the cylinder 7. The various clips 2 are thus securely retained within the cover 5. At the same time, when additional gem clips 2 are required, the moveable cylinder 7 is simply depressed against the biasing action of coil spring 10 to the position shown, e.g., in FIG. 3. Upon release of the cylinder 7 from this position, additional gem clips are attracted upwardly along the outer surface of cylinder 7 as shown, e.g., in FIG. 5, facilitating positioning of clips 2 for easy removal as shown. This is an improvement over the device shown in Hei-2(1990)-85184 where the container 2 itself must be raised along a narrow cylinder 1 to the point where the clips 12 come in contact with magnets 5*a*, 5*b*, 5*c*, positioned at the top of the cylinder (FIGS. 6*a–c*).

The components forming the inventive clip holder 1 (other than the magnets) can be molded from hard plastic or other similar resin, with the cover 5 molded from the transparent plastic. The paper clips 2 themselves are nonmagnetic but magnetizable.

The preceding description of the present invention is merely exemplary and not intended to limit the scope thereof in any way.

What is claimed is:

1. A magnetic holder for paper clips or other magnetizable items, comprising, means for mounting magnets in said holder, and a plurality of adjacent magnets arranged in a longitudinal direction along said mounting means such that magnetic fields either with in said respective magnets and/or emanating therefrom are oriented in mutually opposite directions, magnetic lines of force within said respective fields point in mutually opposite directions and the items are thereby attracted by greater force than when magnets are arranged such that magnetic field lines all point in the same direction, wherein said magnets are additionally arranged upon said mounting means such that one of said magnets being adjacent a longitudinal end of said mounting means possesses greater strength than the other of said magnets so that the magnetic lines of force are stronger at said longitudinal end and thereby attract the magnetizable items towards the longitudinal end.

2. The holder of claim 1, comprising three or more magnets.

3. The holder of claim 1, wherein the longitudinal direction also constitutes a substantially vertical direction with said stronger magnet positioned on top, whereby the items are attracted upwardly.

4. The holder of claim 3, wherein said mounting means comprise a cylinder in which said magnets are positioned and extending in said longitudinal direction.

5. The holder of claim 4, wherein said mounting means additionally comprise an inner concentric spindle on which said cylinder containing said magnets is movably mounted such that said spindle is arranged to be concentrically positioned within said magnets, and additionally comprising means arranged upon or within said spindle for biasing said cylinder in said longitudinal direction.

6. The holder of claim 5, wherein said biasing means are constituted by a coil spring having one end secured or resting upon said spindle and an opposite end abutting against a longitudinal end of said cylinder retaining said magnets.

7. The holder of claim 6, wherein said mounting means additionally comprise a base upon which said spindle is affixed.

8. The holder of claim 7, additionally comprising a dome shaped container mounted upon said base and comprising an opening in a crown thereof and through which said movable cylinder retaining said magnets protrudes.

9. The holder of claim 1, wherein each said magnet is constituted by a horseshoe magnet shaped to form either a complete annular circle having inner and outer radius or such a circle having a gap in continuity.

10. A magnetic holder for paper clips or other magnetizable items, comprising mean for mounting magnets in said holder, and a plurality of adjacent magnets arranged in a longitudinal direction along said mounting means such that magnetic fields either within said respective magnets and/or emanating therefrom are oriented in mutually opposite directions, magnetic lines of force within said respective fields point in mutually opposite directions and the items are thereby attracted by greater force than when magnets are arranged such that magnetic force lines all point in the same direction, and wherein each said magnet is constituted by a horseshoe magnet shaped to form either a complete annular circle having inner and outer radii or such a circle having a gap in continuity.

11. The holder of claim 10, wherein the longitudinal direction also constitutes a substantially vertical direction with a stronger of said two magnets positioned on top, whereby the items are attracted upwardly.

12. The holder of claim 11, wherein said mounting means comprise a cylinder in which said magnets are positioned and extending in said longitudinal direction.

13. The holder of claim 12, wherein said mounting means additionally comprise an inner concentric spindle on which said cylinder containing said magnets is movably mounted such that said spindle is arranged to be concentrically positioned within said magnets, and additionally comprising means arranged upon or within said spindle for biasing said cylinder in said longitudinal direction.

14. The holder of claim 13, wherein said biasing means are constituted by a coil spring having one end secured or resting upon said spindle and an opposite end abutting against a longitudinal end of said cylinder retaining said magnets.

15. The holder of claim 14, wherein said mounting means additionally comprise a base upon which said spindle is affixed.

16. The holder of claim 15, additionally comprising a dome shaped container mounted upon said base and comprising an opening in a crown thereof and through which said movable cylinder retaining said magnets protrudes.

17. The holder of claim 10, comprising three or more magnets.

* * * * *